Nov. 1, 1966  L. C. BLANKENBECLER  3,281,983
EXPENDABLE CASTING DEVICE
Filed Aug. 6, 1964

INVENTOR.
LEONARD C. BLANKENBECLER
BY Noel G. Conway
ATTORNEY

United States Patent Office 3,281,983
Patented Nov. 1, 1966

3,281,983
EXPENDABLE CASTING DEVICE
Leonard C. Blankenbecler, 1518 Hacienda Ave.,
San Clemente, Calif.
Filed Aug. 6, 1964, Ser. No. 387,952
5 Claims. (Cl. 43—43.12)

This invention relates to an expendable casting device, and more particularly, to a device which is secured to a fishing line to provide weight for a good cast, but which automatically releases itself from the fish line when the device falls into the water after the casting operation is complete.

When fishing with live bait, it is desired that there be little weight at the end of the fish line to permit the live bait to swim in a nearly normal manner. When casting down wind no great difficulty is encountered. On the other hand, it is extremely difficult, and practically impossible, to make the desired casts upwind because of the lack of weight on the end of the fish line.

To overcome this problem, a device made in accordance with the present invention is secured to the end of the fish line and provides the weight necessary for a good long cast in any direction. After the device and the live bait hit the water, means included in the device function to release the device from the fish line. At this point, the live bait may swim without being dragged downward by the weight used during the casting operation. To accomplish this, the device includes a non-buoyant body with release means cooperating with said body for securing said body to a fish leader which is attached to the end of the fish line. The release means includes a buoyant member which is movable by the force of the buoyancy after the body is in the water from a position where the leader is secured, to a position where the means releases the leader, whereupon the body may fall free of the leader.

With the foregoing in mind, it is a major object of this device to provide an improved expendable casting device.

Another object of this invention is to provide a low cost, easily used device for casting with live bait.

A further object of this invention is to provide an expendable casting device which uses the forces of buoyancy to release the device from the line being cast after the device has hit the water at the end of the cast.

Still another object of this invention is to provide an expendable casting device which may be quickly attached to the fish line to be cast, which device will automatically release itself from the line after the casting operation is over.

Other and further objects of this invention will become apparent in the detailed description below in conjunction with the attached drawings wherein.

Figures 1, 2:
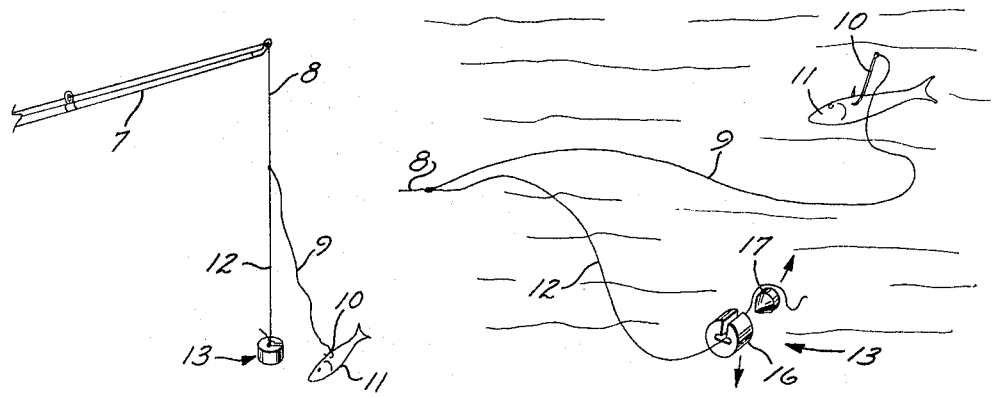
FIGURE 1 is a perspective view of a preferred embodiment of my new casting device ready for the casting operation.
FIGURE 2 is a pictorial view illustrating the manner in which the device in FIGURE 1 is released from the line with the fish after the casting operation.
Figure 3:
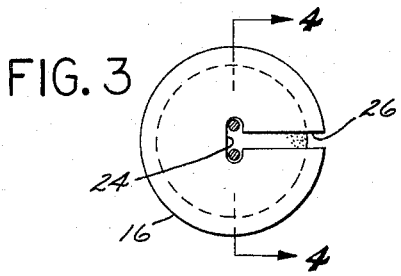
FIGURE 3 is a top view of the expendable casting device in FIGURE 1.

Referring now to FIGURE 1, there is disclosed the end of a fish rod 7 having a fish line 8. Attached to the end of the fish line 8 is a leader 9 to which a hook 10 is attached. A live bait 11 is impaled on the hook 10 in the normal manner. Also attached to the end of the fish line 8 is a leader 12, which is referred to as a tab line, and which has an expendable casting device, indicated generally by the arrow 13, secured to it.

In the casting operation, the casting device 13 furnishes the weight which is desirable and needed for a good long cast.

Referring now to FIGURE 2, after the casting device 13 and the fish 11 have hit the water, the fish line 8 and the leader 12 are slack. At this point, for reasons explained in greater detail below, the casting device 13 rotates from the position shown in FIGURE 1 to a position where the bottom of the casting device 13 is pointed upward. As explained in greater detail below, the particular casting device illustrated includes a non-buoyant body 16 and a buoyant release member 17. Because the non-buoyant body 16 has a specific gravity greater than 1 it sinks. On the other hand, the buoyant release member 17 floats up away from the body 16. For reasons to be explained, this releases the leader 12 so that the body 16 may fall free of the leader.

Referring now to FIGURES 3 to 6, the preferred embodiment of the present invention will be described in greater detail. The non-buoyant body 16 is preferably made out of lead and has a generally cylindrical shape. A cavity 18 is formed within the body 16 and opens through bottom 19 of the body. It will be noted that the cavity 18 is enclosed by a cylindrical wall 21 in the body 16 with a conical wall 22 extending upwardly from the cylindrical wall. The cavity 18 is communicated with top 23 of the body 16 by a passage 24.

It will be noted that upper portion 25 of the body 16 has more weight than the lower portion of the body. As will be described in greater detail below, this facilitates the rotation of the body 16 after it has hit the water subsequent to the casting operation for the purpose of allowing the buoyant release member 17 to eject itself upward from the body.

For a purpose to be described in greater detail below, there is a transverse slot 26 extending from one side of the body 16 to the passage 24.

Before describing the manner in which the casting device 13 is secured to the leader 12, the buoyant release member 17 will be described in greater detail. Preferably, the release member 17 comprises a buoyant inner-body 28 made of some material such as polystyrene, polyethylene foam, or balsa wood. The inner-body 28 is covered, preferably, by a latex coating 29 which protects the relatively soft inner-body and facilities proper gripping of the leader 12 in the manner to be described. The shape of the release member 17 is of importance. The release member 17 is shaped complementary to the shape of the cavity 18. Accordingly, there is provided a cylindrical surface 30 with conical surface 31 as shown.

The manner of attaching the casting device 13 to the leader 12 will now be described. First, end 33 of the leader 12 is folded back to form a loop 34 (see FIGURE 5). At this point, the leader 12 is moved laterally through transfer slot 26 in the direction indicated by arrow 35 in FIGURE 5. With the loop 34 in the position shown in FIGURE 5, the buoyant release member 17 is positioned in the center of the loop 34 as shown. At this point, the leader 12 is pulled upwardly, as indicated by arrow 36 in FIGURE 5, while the release member 17 is guided into the cavity 18 to the position shown in FIGURE 4.

Figure 4:
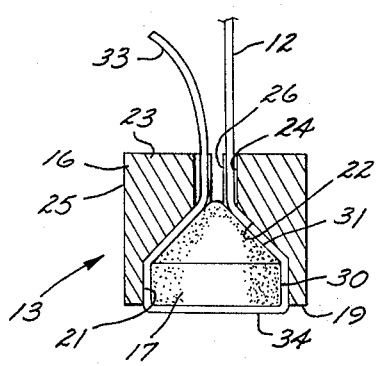
FIGURE 4 is a cross-sectional view of casting device in FIGURE 1, taken along line 4—4 in FIGURE 3.
Figure 6:
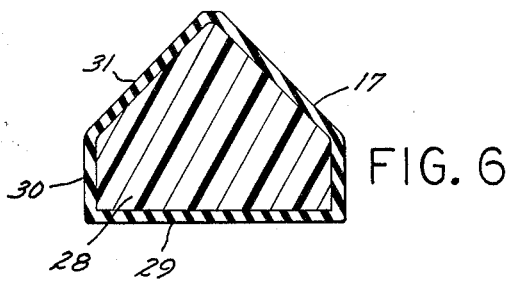
FIGURE 6 is an enlarged cross-sectional view of the buoyant release member used in the device shown in FIGURE 4.

With the device 13 in the assembled condition shown in FIGURE 4, the leader 12 is gripped between surfaces 21 and 30 as well as surfaces 22 and 31. Further, because the loop 34 extends around the member 17, upward force on the leader 12 (or downward force on the body 16) pulls the member 17 more securely into the cavity 18—causing the leader 12 to be gripped more firmly between the surfaces. The coating 29 functions to protect the inner body 28 from the cutting action of the leader 12, as well as, assisting in gripping the leader.

Figure 5:
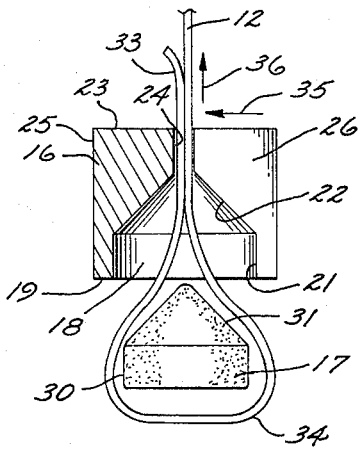
FIGURE 5 is a cross-sectional view of casting device in FIGURE 4 disclosing an intermediate step in securing the device to a leader.

The leader 12 may be inserted into the position shown in FIGURE 5 without the provision of the transverse slot 26. For example, the passage 24 could be made large enough that the loop 34 (in a compressed condition) may be passed therethrough. Alternatively, the end 33 may be extended down through passage 24 and then passed back up through the passage 24.

It will be noted in FIGURE 4, that in the assembled condition, nearly all of the release member 17 lies within the cavity 18. Since upper portion 25 of the body 16 is so much heavier than the lower portion of the body, the buoyancy of the member 17 is sufficient to cause the device 13 to turn upside down after it has hit the water subsequent to the casting operation. Naturally the release member 17 could extend further from the cavity 18 to further augment rotation of the casting device 13 after it hits the water. Also, the cavity could be a notch in a non buoyant body.

Further, while the particular illustrated shape of the cavity 18 and the release member 17 are preferred for better gripping action, other shapes of the cavity and release member could be used. Also, the device could be removably connected directly to the fish line 9 thus eliminating the need of the tab line 12.

While only a few embodiments of my invention have been shown and described in detail, it will be apparent to those skilled in the art that such is by way of illustration only and numerous changes may be made thereto without departing from the spirit of the present invention. Accordingly, it is my intention that the invention be limited solely by the scope of the appended claims.

I claim:
1. An expendable casting device comprising:
   a non-buoyant body having a cavity therein opening through the bottom of said body, said non-buoyant body having means for receiving therethrough a leader extending from the top of the body through said cavity and out of the bottom of said body;
   a buoyant release member removably received in said cavity, said release member being shaped complimentarily with said cavity so as to engage and grip any leader extending through said cavity, the upper half of the device being materially heavier than the lower half of the device to cause the device to invert in the water, said member being shaped so as to permit forces of buoyancy to eject the member from said cavity when the casting device is in the water to thereby release the grip on the leader in the cavity, whereby the non-buoyant body may fall free of the leader after the casting device has been submerged in the water.

2. An expendable casting device comprising:
   a non-buoyant body;
   release means cooperating with said body for securing said body to a leader, said means including a buoyant member movable by the force of buoyancy when the member is in water from a position where the leader is secured to a position where the means releases the leader and the body may fall free of the leader, said release means being at least partially responsive to the tension on a leader to which the device is secured such that increased tension on the leader delays the action of the release means.

3. An expendable casting device comprising:
   a non-buoyant body having a central cavity opening through the bottom of the body, said cavity being largest at the bottom of the body, a passage in said body communicating said cavity with the top of the body and adapted to receive therethrough a leader;
   a buoyant release member removably received in said cavity, said member cooperating with said cavity to engage and grip a leader in said cavity, said member being removable from said cavity by buoyant forces on it when the device is submerged in water, the upper half of the device being materially heavier than the lower half of the device to cause the device to invert in water when the device is submerged in the water.

4. An expendable casting device set forth in claim 3 wherein
   said body is heavier at its upper half than its lower half, whereby after the device hits the water, the weight at the top of the body assists the buoyant release member in rotating the body in a position where the buoyant member may float upward out of the cavity.

5. An expendable casting device comprising:
   a non-buoyant body having a central cavity opening through the bottom of the body, said cavity being larger at the bottom of the body, a passage in said body communicating said cavity with the top of the body and adapted to receive therethrough a leader;
   a buoyant release member removably received in said cavity, said member cooperating with said body to engage and grip a leader in said cavity, said member being removable from said cavity by buoyant forces on it when the device is submerged in water, the lower half of the casting device being more buoyant than the upper half thereof, whereby the greater buoyancy of the lower end of the release member assists in rotating the body to a position where the release member may float up out of the cavity after the device has hit the water subsequent to the casting operation.

References Cited by the Examiner

UNITED STATES PATENTS 2,687,592  8/1954  Purcell _____ 43—43.12

ABRAHAM G. STONE, *Primary Examiner.*

ALDRICH F. MEDBERY, *Examiner.*

R. L. HOLLISTER, *Assistant Examiner.*